United States Patent
Von Novak, III

(10) Patent No.: US 9,630,713 B1
(45) Date of Patent: Apr. 25, 2017

(54) UNMANNED AERIAL VEHICLE WITH ADJUSTABLE AIMING COMPONENT

(71) Applicant: QUALCOMM Incorporated, San Diego, CA (US)

(72) Inventor: William Henry Von Novak, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 14/972,342

(22) Filed: Dec. 17, 2015

(51) Int. Cl.
| | | |
|---|---|---|
| *B64C 15/00* | (2006.01) | |
| *B64C 19/00* | (2006.01) | |
| *B64C 39/00* | (2006.01) | |
| *B64C 39/02* | (2006.01) | |
| *B64D 47/08* | (2006.01) | |
| *B64C 25/52* | (2006.01) | |

(52) U.S. Cl.
CPC ............ *B64C 39/024* (2013.01); *B64C 25/52* (2013.01); *B64D 47/08* (2013.01)

(58) Field of Classification Search
CPC combination set(s) only.
See application file for complete search history.

(56) References Cited

U.S. PATENT DOCUMENTS

| | | | |
|---|---|---|---|
| 5,575,438 A | 11/1996 | McGonigle et al. | |
| 6,923,404 B1 | 8/2005 | Liu et al. | |
| 8,720,816 B2 * | 5/2014 | Salkeld | B64C 17/04 244/17.19 |
| 8,903,568 B1 * | 12/2014 | Wang | B64C 19/00 244/189 |
| 2010/0012790 A1 * | 1/2010 | Bostan | B64C 3/385 244/23 A |
| 2011/0280937 A1 * | 11/2011 | Moriuchi | A61K 9/4891 424/452 |

(Continued)

FOREIGN PATENT DOCUMENTS

| | | |
|---|---|---|
| GB | 2516620 A | 2/2015 |
| WO | 2004065208 A2 | 8/2004 |

(Continued)

OTHER PUBLICATIONS

International Search Report and Written Opinion—PCT/US2016/058323—ISA/EPO—Jan. 19, 2017.

*Primary Examiner* — Yonel Beaulieu
(74) *Attorney, Agent, or Firm* — The Marbury Law Group, PLLC

(57) ABSTRACT

Methods, devices, and systems of various embodiments are disclosed for operating a UAV. Various embodiments include a UAV having a pivotal platform, a tilt assembly, and a processor. The pivotal platform may be configured to selectively tilt relative to a frame of the UAV. The tilt assembly may be configured to change a tilt angle of the pivotal platform. The processor may be coupled to the tilt assembly and configured with processor-executable instructions to determine whether to implement a first change of the tilt angle of the pivotal platform in order to causes a first adjustment of a lift/drag profile of the UAV. The processor may also be configured to activate the tilt assembly to implement the determined first change in the tilt angle of the pivotal platform in response to determining that the first change should be implemented.

28 Claims, 8 Drawing Sheets

(56) References Cited

U.S. PATENT DOCUMENTS

| | | | |
|---|---|---|---|
| 2014/0008498 A1* | 1/2014 | Reiter | B64C 29/02 244/7 A |
| 2015/0021430 A1 | 1/2015 | Paduano et al. | |
| 2015/0028155 A1* | 1/2015 | Reiter | B64C 27/16 244/39 |
| 2015/0163849 A1 | 6/2015 | Bauer et al. | |
| 2015/0232178 A1* | 8/2015 | Reiter | B64C 29/0033 244/7 A |
| 2016/0001883 A1* | 1/2016 | Sanz | B64F 1/02 244/17.23 |
| 2016/0088498 A1* | 3/2016 | Sharawi | G01R 29/10 370/241 |
| 2016/0159463 A1* | 6/2016 | Wang | B64C 19/00 701/2 |

FOREIGN PATENT DOCUMENTS

| | | |
|---|---|---|
| WO | 2013074545 A1 | 5/2013 |
| WO | 2014108026 A1 | 7/2014 |
| WO | 2015105886 A1 | 7/2015 |

* cited by examiner

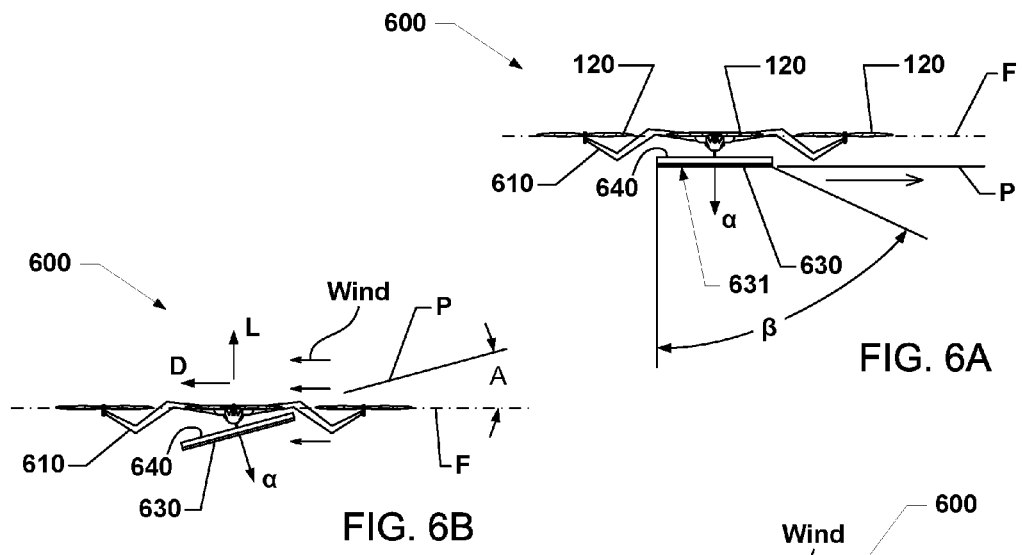
FIG. 6A
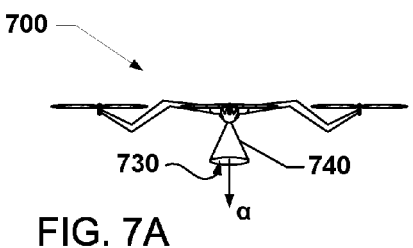
FIG. 6B
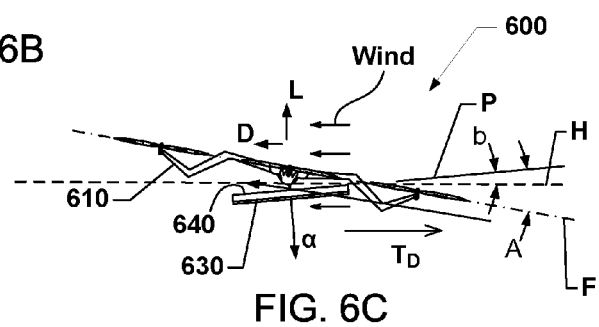
FIG. 6C
FIG. 7A
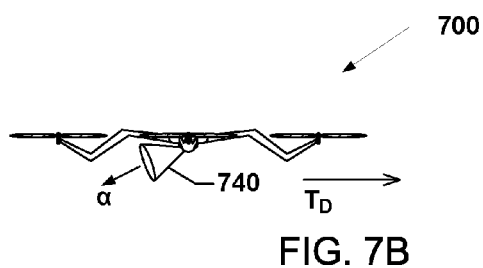
FIG. 7B
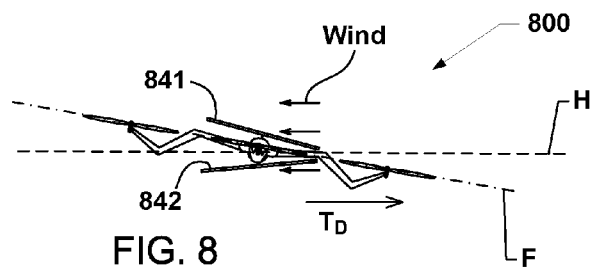
FIG. 8

UNMANNED AERIAL VEHICLE WITH ADJUSTABLE AIMING COMPONENT

BACKGROUND

Unmanned aerial vehicles (UAVs), also referred to as "drones," are commonly used for delivery, surveying, photography, and/or power or communications repeater functions. Some UAVs include planar component that are aimed in a particular direction for operation, such as antennas and solar panels. As part of normal flight, rotor-powered UAVs (e.g., quadcopters) pitch down in order to apply thrust from the flight rotors in the direction of travel. However, pitching down causes the planar array platform to also tip, which can generate negative lift for the UAV. While power to the rotors may be increased in order to generate more lift to compensate for negative lift generated by tilted panels, this tends to reduce the operating range and flight time of the UAV due to the increase power drain on the batteries.

SUMMARY

Various embodiments include a UAV having a pivotal platform, a tilt assembly, and a processor, and methods for operating such a UAV. The pivotal platform may be pivotally coupled to a frame of the UAV and configured to selectively tilt relative to the frame, and the tilt assembly may be configured to change a tilt angle of the pivotal platform. The processor may be coupled to the tilt assembly, and the processor may be configured with processor-executable instructions to determine whether to implement a first change of the tilt angle of the pivotal platform in order to causes a first adjustment of a lift/drag profile of the UAV. The processor may activate the tilt assembly to implement the determined first change in the tilt angle of the pivotal platform in response to determining that the first change should be implemented.

In some embodiments, an aiming component may be fixed to or otherwise supported by the pivotal platform, and the aiming component may include an aiming surface facing away from the pivotal platform in a first aiming direction. The aiming component may operate at an acceptable level when the first aiming direction extends within a first arc of directions extending away from the UAV. The first change in the tilt angle may cause a corresponding change to the first aiming direction. The processor may also be configured with processor-executable instructions to determine whether to implement the first change of the tilt angle of the pivotal platform based on the first aiming direction, the first arc of directions, and the first adjustment to the lift/drag profile.

In some embodiments, the pivotal platform may be centrally mounted on an upper side of the frame, and the first aiming direction may extend above the UAV. In some embodiments, the pivotal platform may be centrally mounted on a lower side of the frame, and the first aiming direction may extend below the UAV. In some embodiments, the pivotal platform may be an annular structure surrounding the frame.

In some embodiments, the aiming component may include a planar antenna, a reflector, a solar panel, a camera, and/or a wireless power link. In some embodiments, the pivotal platform may include a hollow conical structure with a wider open end thereof spaced away from the tilt assembly, and the aiming component may be a wireless recharging target configured to receive power for recharging the UAV. In some embodiments, the hollow conical structure serves as a primary landing gear assembly for the UAV.

In some embodiments, the tilt assembly may include a servomechanism configured to drive the pivotal platform to the determined first change of the tilt angle. In some embodiments, the tilt assembly, once activated, may allow the tilt angle to change in response to external forces imparted on the UAV. In some embodiments, the tilt assembly may include a biasing element configured to induce the determined first change in the tilt angle.

In some embodiments, the UAV may include a sensor coupled to the processor, and the processor may be configured with processor-executable instructions to receive an input from the sensor and use the input received from the sensor to determine at least one tilt angle adjustment factor for determining whether the tilt angle should be adjusted. In some embodiments, the UAV may include a receiver coupled to the processor, and the processor may be configured with processor-executable instructions to receive an input from the receiver and use the input received from the receiver to determine at least one tilt angle adjustment factor for determining whether the tilt angle should be adjusted.

Some embodiments include a method of operating a UAV including receiving, in a processor, a first input for assessing a tilt angle of a pivotal platform relative to a frame of the UAV, selectively tilting the pivotal platform relative to the frame and a first change in the tilt angle to cause a first adjustment of a lift/drag profile of the UAV. Based on the first input, the processor may determine at least one tilt angle adjustment factor selected from a group consisting of the first aiming direction, the first arc of directions, and the first adjustment of the lift/drag profile. In some embodiments, the first change of the tilt angle may be determined based on the first aiming direction, the first arc of directions, and the first adjustment to the lift/drag profile, and the tilt assembly may be activated to change the tilt angle according to the first change.

In some embodiments, activating the tilt assembly to change the tilt angle may include activating a servomechanism and/or allowing at least one of a biasing element, environmental forces, and aerodynamic forces to induce a change in the tilt angle, which may include releasing the pivotal platform from a first fixed position. In some embodiments, the tilt angle achieving the first change may be detected when the pivotal platform reaches a second position, at which point the pivotal platform may be locked in the second position. Elements of the UAV may be activated for initiating an aerial maneuver based the first change of the tilt angle.

Further embodiments may include a UAV having means for performing functions of the method operations described above. Further embodiments include a non-transitory processor-readable storage medium having stored thereon processor-executable instructions configured to cause a processor to perform operations of the above-discussed method operations.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIG. 6A is a side elevation view of a UAV with an aiming component and a pivotal platform on a lower side of the UAV according to various embodiments.

FIG. 6B is a side elevation view of the UAV in FIG. 6A with the pivotal platform tilted according to various embodiments.

FIG. 6C is a side elevation view of the UAV in FIG. 6A pitching down on one side and with the pivotal platform tilted according to various embodiments.

FIG. 7A is a side elevation view of a UAV with a conical pivotal platform and aiming component on a lower side of the UAV according to various embodiments.

FIG. 7B is a side elevation view of the UAV in FIG. 6A with the conical pivotal platform tilted according to various embodiments.

FIG. 8 is a side elevation view of a UAV with upper-side and lower side pivotal platforms and corresponding aiming components of a UAV according to various embodiments.

DETAILED DESCRIPTION

Figure 1A:
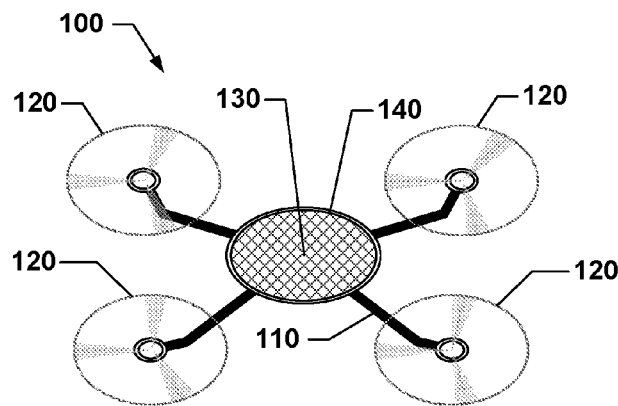
FIG. 1A is a perspective view of a UAV with an aiming component and a pivotal platform and on an upper side of the UAV according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include a UAV including a pivotal platform pivotally coupled to the UAV and configured to selectively tilt relative to a frame of the UAV. Changing the tilt angle of the pivotal platform relative to the frame may enable the UAV to adjust the lift/drag profile of the UAV. In addition, the UAV may include an aiming component fixed to the pivotal platform. The aiming component may include a focus direction of an aiming surface that faces away from the pivotal platform at the tilt angle. A tilt assembly may be provided that is configured to change the tilt angle. The UAV may also include a processor coupled to the tilt assembly and configured with processor-executable instructions to determine whether changes to the tilt angle are appropriate under the current flight and operating conditions based on a weighted priority of the focus direction and the lift/drag profile. In response to determining that a change of the tilt angle is appropriate, the processor may activate the tilt assembly to implement the determined tilt angle changes.

As used herein, the term "UAV" refers to one of various types of unmanned aerial vehicle. A UAV may include an onboard computing device configured to fly and/or operate the UAV without remote operating instructions (i.e., autonomously), such as from a human operator or remote computing device. Alternatively, the onboard computing device may be configured to fly and/or operate the UAV with some remote operating instruction or updates to instructions stored in a memory of the onboard computing device. The UAV may be propelled for flight in any of a number of known ways. For example, a plurality of propulsion units, each including one or more rotors, may provide propulsion or lifting forces for the UAV and any payload carried by the UAV. In addition, the UAV may include wheels, tank-treads, or other non-aerial movement mechanisms to enable movement on the ground, on or in water, and combinations thereof. The UAV may be powered by one or more types of power source, such as electrical, chemical, electro-chemical, or other power reserve, which may power the propulsion units, the onboard computing device, and/or other onboard components.

The term "computing device" is used herein to refer to an electronic device equipped with at least a processor. Examples of computing devices may include UAV flight control and/or mission management computer that are onboard the UAV, as well as remote computing devices communicating with the UAV configured to perform operations of the various embodiments. Remote computing devices may include wireless communication devices (e.g., cellular telephones, wearable devices, smart-phones, web-pads, tablet computers, Internet enabled cellular telephones, Wi-Fi® enabled electronic devices, personal data assistants (PDA's), laptop computers, etc.), personal computers, and servers. In various embodiments, computing devices may be configured with memory and/or storage as well as wireless communication capabilities, such as network transceiver(s) and antenna(s) configured to establish a wide area network (WAN) connection (e.g., a cellular network connection, etc.) and/or a local area network (LAN) connection (e.g., a wireless connection to the Internet via a Wi-Fi® router, etc.).

The term "server" as used herein refers to any computing device capable of functioning as a server, such as a master exchange server, web server, and a personal or business computing device configured with software to execute server functions (e.g., a "light server"). Thus, various computing devices may function as a server, such as any one or all of cellular telephones, smart-phones, web-pads, tablet computers, Internet enabled cellular telephones, Wi-Fi enabled electronic devices, laptop computers, personal computers, and similar electronic devices equipped with at least a processor, memory, and configured to communicate with a UAV. A server may be a dedicated computing device or a computing device including a server module (e.g., running an application that may cause the computing device to operate as a server). A server module (or server application) may be a full function server module, or a light or secondary server module (e.g., light or secondary server application). A light server or secondary server may be a slimmed-down version of server type functionality that can be implemented on a personal or business computing device, such as a smart phone, thereby enabling it to function as an Internet server (e.g., an enterprise e-mail server) to a limited extent, such as necessary to provide the functionality described herein. An example of server suitable for use with the various embodiments is described with reference to FIG. 9.

The word "exemplary" is used herein to mean "serving as an example, instance, or illustration." Any implementation described herein as "exemplary" is not necessarily to be construed as preferred or advantageous over other implementations.

Figure 1B:
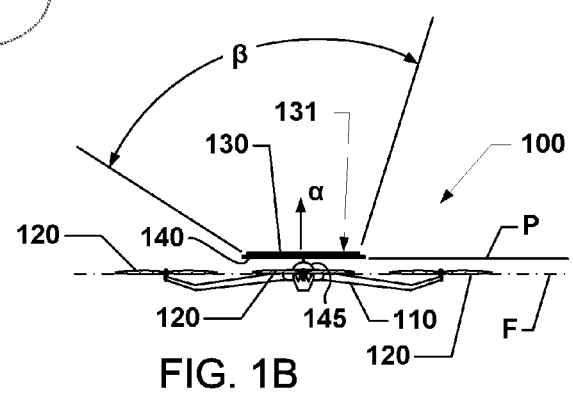
FIG. 1B is a side elevation view of the UAV in FIG. 1A according to various embodiments.
Figure 1C:
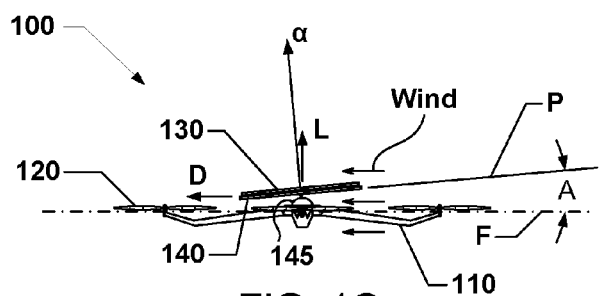
FIG. 1C is a side elevation view of the UAV in FIG. 1A with the pivotal platform tilted according to various embodiments.

FIGS. 1A-1C illustrate a UAV 100 with an aiming component 130 and a pivotal platform 140 pivotally coupled to an upper side of the UAV 100 in accordance with some embodiments. The UAV 100 may include a frame 110, a number of rotors 120, and the aiming component 130 mounted on or otherwise supported by the pivotal platform 140. The frame 110 may provide structural support for the pivotal platform 140 and the motors associated with the rotors 120. In addition, the pivotal platform 140 may support and/or hold the aiming component 130 so that the aiming component 130 is fixed relative to the pivotal platform 140. The pivotal platform 140 may be smaller, larger, or of equal size to the aiming component 130. Optionally, the pivotal platform 140 may form all or part of a housing of the aiming component 130.

For ease of description and illustration, some detailed aspects of the UAV 100 are omitted, such as wiring, frame structure interconnects, landing columns/gear, or other features that would be known to one of skill in the art. For example, while the UAV 100 is shown and described as having a frame 110 having a number of support members or frame structures, the UAV 100 may be constructed using a molded frame in which support is obtained through the molded structure. In the illustrated embodiments, the UAV 100 has four rotors 120. However, more or fewer than four rotors 120 may be used.

The aiming component 130 may include an aiming surface 131 facing away from the pivotal platform 140 in a first aiming direction α (as illustrated in FIG. 1B). Examples of particular aiming component types include planar antennas, solar panels/collectors, cameras, wireless power links, reflectors, or other components that are aimed at a target and have operational aiming criterion. Depending on the type of platform, operational aiming criterion may limit the directions and angles at which the aiming component 130 will be tilted. For example, the aiming component 130 may only operate acceptably when the first aiming direction α extends within a first arc of directions β extending away from the UAV 100. For example, when the first aiming direction α, which is generally perpendicular to the aiming surface 131, does not extend within the first arc of directions β, the aiming component 130 may not operate or may operate below an optimal or acceptable level. The first arc of directions β generally extends toward the target at which the aiming component 130 is intended to be aimed. For example, a planar antenna may be aimed at a remote transceiver target, a solar panel may be aimed toward sunlight, a camera may be aimed toward a physical target, and wireless power links may be aimed toward a power source. Thus, the angular extent of the first arc of directions β may depend upon the type of aiming component and the relative position of the intended target with respect to the UAV. Some types of aiming components may have a smaller first arc of directions β for acceptable operations than other types of aiming component. With the aiming component 130 fixed to the pivotal platform 140, any changes in a tilt angle A of the UAV 100 will cause a corresponding change to the first aiming direction α. Thus, changing the tilt angle A may maintain the first aiming direction α within the first arc of directions β.

The size, shape, and orientation of the pivotal platform 140, as well as the aiming component 130, may affect a lift/drag profile of the UAV 100 during translational flight when air is passing over the UAV structures. Translational flight includes any circumstances in which air moves relative to the UAV 100 while in-flight, including both when the UAV is transiting and when maintaining over a fixed geographic location against a wind.

The lift/drag profile of the UAV 100 reflects a ratio of an amount of lift L generated by one or more flight surfaces of the UAV 100 divided by an amount of drag D of the entire UAV. Planar structures include broad flight surfaces, and thus have the potential to significantly impact the lift/drag profile of the UAV 100, with the amount of lift potential depending on the size and orientation of such planar structures. An orientation of the pivotal platform 140, along with the aiming component 130, may increase, decrease, or contribute little to the lift/drag profile of the UAV 100. For example, if a leading edge of the pivotal platform 140 (i.e., a side facing into a wind) is tilted upward with respect to the direction of travel during translational flight (as illustrated in FIG. 1C), air passing over the pivotal platform 140 will contribute lift that may increase the lift/drag profile of the UAV 100. In contrast, a downwardly tilted leading edge (with respect to the direction of travel) may generate negative lift, which may decrease the lift/drag profile of the UAV 100.

In various embodiments, the pivotal platform 140 may be coupled to a tilt assembly 145 and configured to control the tilt angle A between the pivotal platform 140 and the frame 110. A processor onboard the UAV 100 may actuate or otherwise control the tilt assembly 145 to change and/or lock the tilt angle A for adjusting the lift/drag profile of the UAV 100. In addition, when the pivotal platform 140 is tilted relative to the frame 110, so too is the aiming component 130 tilted relative to the frame 110. Thus, changes in the tilt angle A may also change the first aiming direction α of the aiming component 130.

Figure 1D:
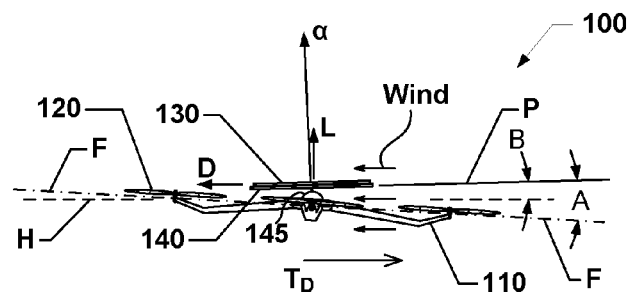
FIG. 1D is a side elevation view of the UAV in FIG. 1A pitching down on one side and with the pivotal platform tilted according to various embodiments.

FIG. 1D illustrates how the pivotal platform 140 may be oriented during translational flight in order to minimize drag without adding to lift. With reference to FIGS. 1A-1D, a central plane F (illustrated as a line extending away from the UAV 100) of the frame 100 may be used as a frame of reference for the frame 110 relative to the pivotal platform 140. The central plane F may be generally horizontal when the UAV 100 is hovering in-place or has landed. In addition, the central plane F may be parallel to a rotor plane in which one or more of the rotors 120 spin. Similarly, a platform plane P (illustrated as a line extending away from the pivotal platform 140) may represent another planar frame of reference that is fixed relative to a plane in which the pivotal platform 140 or a surface thereof is disposed. The tilt angle A between the central plane F and the platform plane P may represent a measure of tilt angle between the frame 110 and the pivotal platform 140 (as illustrated in FIGS. 1C and 1D). In contrast, FIG. 1B illustrates the pivotal platform 140 when disposed parallel to the frame 110 (i.e., no tilt angle A or tilt angle A=0).

With reference to FIGS. 1A-1D, various embodiments may be implemented using a variety of UAV 100 configurations. A flight propulsion system for the UAV 100 may include one or more rotors 120 that generate a lifting force sufficient to lift the UAV 100 (including the UAV structure, motors, electronics, and power source) and any loads that may be attached to the UAV 100 (e.g., a payload). The flight propulsion system may be powered by an electrical power source such as a battery. Additionally, the flight propulsion system may include a supplemental-fueled motor, such as one or more internal combustion motors.

The flight propulsion system may be vertical or horizontally mounted depending on the flight mode of the UAV. A common UAV 100 configuration suitable for use in the various embodiments is a "quad copter" configuration. In an example quad copter configuration (illustrated in FIG. 1A), four (thus the term "quadcopter") horizontally configured rotors 120 are driven by motors that are fixed to the frame 110. The frame 110 may include a frame structure with landing skids that supports the rotors 120, a power source (e.g., power module 170 in FIG. 5), a payload securing mechanism (e.g., payload-securing unit(s) 175 in FIG. 5), and other equipment. A payload may be attached (e.g., in a central area underneath the frame 110 of the UAV 100), such as an area enclosed by the frame 110 and skids underneath the flight power sources or propulsion units. A quad copter-style horizontal rotor may enable the UAV 100 to fly in any unobstructed horizontal and vertical direction as well as hover. A quad copter configuration is used for illustrative purposes in the examples described herein; however, other UAV designs may be used.

The UAV 100 may use differential thrust generated by the rotors 120 for control. For example, in a four-rotor design (i.e., a quad copter), all four rotors are generally used to generate sufficient thrust to fly. Adjusting the amount of lift generated by each rotor enables the UAV 100 to control attitude. For example, briefly decreasing thrust generated by two first neighboring rotors (e.g., the two right-side rotors 120 in the orientation shown in FIG. 1A) and/or increasing thrust generated by the two second neighboring rotors opposed to the first neighboring rotors (e.g., the two left-side rotors 120 in the orientation shown in FIG. 1A) causes the UAV to pitch down on the side of the first neighboring rotors (i.e., the rotors generating less thrust). As a result of this pitch, the rotors generate lift exhibiting a horizontal thrust vector component that may drive the UAV 100 in a travel direction $T_D$ that corresponds to the side of the UAV 100 that has pitched down (as illustrated in FIG. 1D).

By changing the pairs of rotors 120 that act in unison, in opposition, or a combination thereof, the UAV 100 may control roll and yaw in any direction. By ensuring the total motor power stays the same to maintain level flight, differential control may control the UAV's attitude without affecting total vertical thrust. By controlling all rotors together, the UAV 100 may increase or decrease thrust, and thus change altitude. Ordinarily control is obtained by running all rotors "forward," resulting in a downward thrust that generates lift (including while hovering). Occasionally a rotor may be run "backwards" (i.e., reversing the rotor) to generate an upward thrust that may be used to make the UAV 100 descend, which can be particularly useful when the downward force of gravity is unavailable.

The platform angle B between the platform plane P of the pivotal platform 140 and a horizontal plane H may be different from the tilt angle A when the UAV 100 pitches down on one side (as illustrated in FIG. 1D). In various embodiments, a processor of the UAV or coupled to the UAV may determine whether a first change of the tilt angle A of the pivotal platform 140 may be performed based on the first aiming direction α at which the aiming surface 131 is currently or should be aiming, the first arc of directions β suitable for aiming at the intended target, and a lift/drag profile resulting from the angle of the pivotal platform 140 with respect to air passing over the UAV 100. The processor may ensure or attempt to ensure the aiming component 130 operates at acceptable tilt angles of the pivotal platform 140. Under various flight conditions, certain tilt angles of the pivotal platform 140 may result in too much lift, negative lift, and/or drag. If the processor determines that the effects upon lift and drag of the current tilt angle of the pivotal platform 140 are unsuitable for current plight conditions, the processor may determine that a change in the tilt angle A of the pivotal platform 140 is appropriate. Alternatively or additionally, certain target tilt angles of the pivotal platform 140 relative to the UAV 100 may place the first arc of directions β outside a range of aiming directions for the aiming surface 131, in which case the processor may determine that a change in the tilt angle A of the pivotal platform 140 is appropriate. Thus, in determining whether to change the first tilt angle A, the processor may weigh priorities of the need to have the aiming component 130 operate, the level at which the aiming component 130 needs to operate, and the impact on the lift/drag profile as a result of changing the tilt angle A.

During a flight, the processor of the UAV 100 may adjust the tilt angle A of the pivotal platform 140 so that either a leading edge of the platform presents the minimum profile to the relative wind, or generates some lift. A small amount of lift generated by the platform may lead to a reduction in overall energy used by the UAV 100, since the required power from the motors will be reduced. This may be achieved by tilting the pivotal platform 140 up slightly above the horizontal plane H (e.g., as shown in FIG. 1D). The processor may take into account the attitude of the UAV in determining the amount of tilt that should be applied to the pivotal platform 140.

Figure 2:
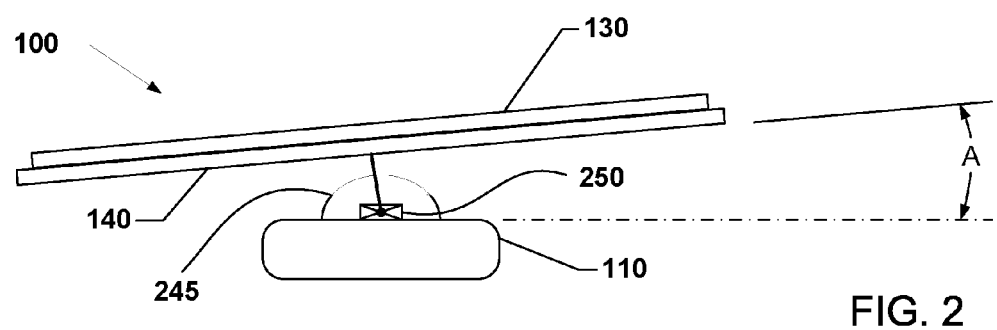
FIG. 2 is a side elevation isolated view of a pivotal platform, an aiming component, a tilt assembly, and a portion of a UAV frame according to various embodiments.

FIG. 2 illustrates a tilt assembly 245 for a UAV, such as the UAV 100 in FIGS. 1A-1D. With reference to FIGS. 1A-2, the tilt assemblies 145, 245 may include a servo-mechanism 250 configured to adjust and maintain the tilt angle A of the pivotal platform 140, along with the aiming component 130 positioned thereon. The servomechanism 250 may be driven until the tilt angle A indicated by the servomechanism 250 achieves a desired tilt angle of the pivotal platform 140. In general, the pivotal platform 140 may pivot about a center of the pivotal platform 140, a gravitational center of the combined pivotal platform 140 and the aiming component 130, and/or a central pressure point of the pivotal platform 140. The central pressure point of the pivotal platform 140 may be based upon both the center of mass and aerodynamic forces. In some embodiments, the connection between the tilt assembly 245 and the pivotal platform 140 may be designed to minimize servo loads when changing the tilt angle A.

Figure 3:
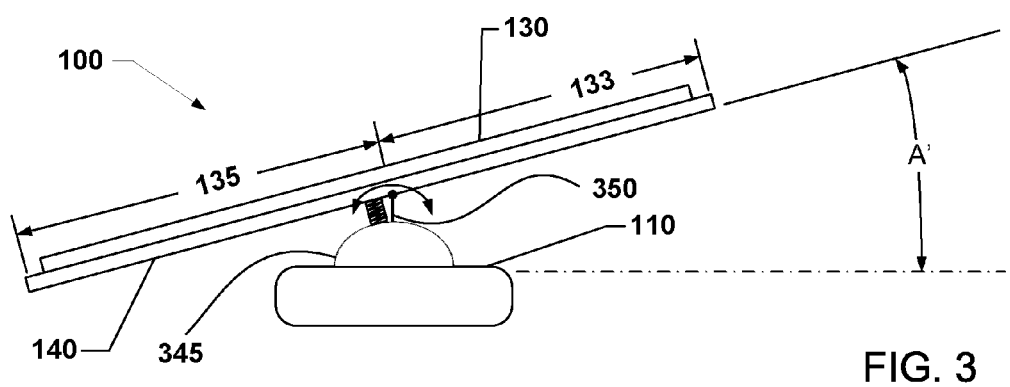
FIG. 3 is a side elevation isolated view of a pivotal platform, an aiming component, another tilt assembly, and a portion of a UAV frame according to various embodiments.

FIG. 3 illustrates a tilt assembly 345 for a UAV, such as the UAV 100 in FIGS. 1A-1D. With reference to FIGS. 1A-3, the tilt assemblies 145, 245, 345 may include a pivot mechanism 350 configured to allow the pivotal platform 140, along with the aiming component 130, to change a tilt angle A' in response to external forces, such as the wind moving relative to the UAV 100, momentum, gravity, and/or aerodynamic forces. In some embodiments, the pivotal platform 140 may be allowed to pivot naturally to align with airflow to a limited extent.

In some embodiments, the pivot mechanism 350 may attach to the pivotal platform 140 at an off-center pivot point, so that a first side 133 of the aiming component 130 and pivotal platform 140 is shorter than or weighs less than a second side 135 of the aiming component 130 and pivotal platform 140. This configuration may favor pivotal movement toward a heavier side (e.g., 135). However, the pivot mechanism 350 may limit the extent of pivotal movements by including a biasing element (e.g., a spring). The biasing element applied to the pivotal platform 140 or internal to the pivotal mechanism 350 may induce the platform to move in a direction such as to counteract the tendency of a heavier side to "droop" or to cause the pivotal platform 140 to return to a default position (e.g., parallel to the central plane F) when no forces are acting on the surfaces.

Figure 4:
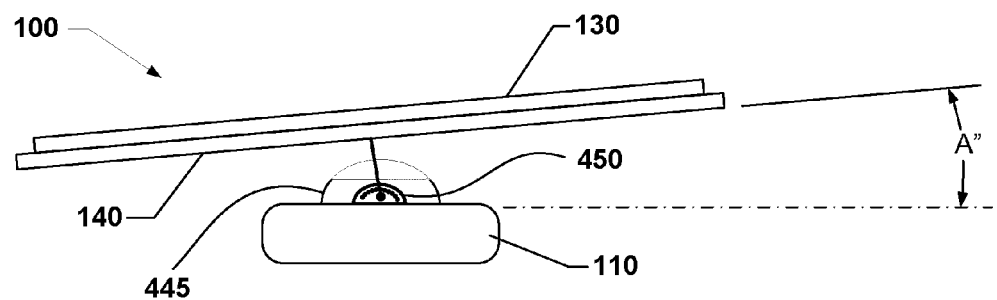
FIG. 4 is a side elevation isolated view of a pivotal platform, an aiming component, another tilt assembly, and a portion of a UAV frame according to various embodiments.

FIG. 4 illustrates a tilt assembly 445 for a UAV, such as the UAV 100 in FIGS. 1A-1D. With reference to FIGS. 1A-4, the tilt assemblies 145, 245, 345, 445 may include a pivot mechanism 450 configured to allow the pivotal platform 140 to pivot freely to change a tilt angle A" in response to applied aerodynamic and gravitational forces. Once the pivotal platform 140 achieves a target orientation, which may be measured by the tilt angle A", the pivot mechanism 450 may be "locked" at that tilt angle, such as by a clutch or other means. Since the UAV 100 may achieve a wide variety of relative wind angles through various flight regimes (climb, descent, forward motion) the pivot mechanism 450 may be used to frequently change and lock the tilt angle A".

The tilt assemblies 145, 245, 345, 445 of various embodiments may be one-dimensional couplings (i.e., configured to pivot about a single axis) or more complex couplings, such as a universal or flexible joint (i.e., configured to pivot about more than one axis). The tilt assemblies 145, 245, 345, 445 may be configured to adjust the tilt angle of the pivotal platform 140 along at least one axis. The UAV 100 may make periodic adjustments of the platform, such as to track the sun (in the case of a platform holding a solar array) or re-trim the platform for changing winds. Choosing a location for the pivot may effectively define with a "nose" and a "tail" of the UAV 100 since the relative wind may be required to come from a specific direction to achieve accurate positioning of the pivotal platform 140. Additional considerations may be given when using tilt assemblies 145, 245, 345, 445 configured to allow pivotal movement about multiple axis or even 360 degrees of pivotal movement.

Figure 5:
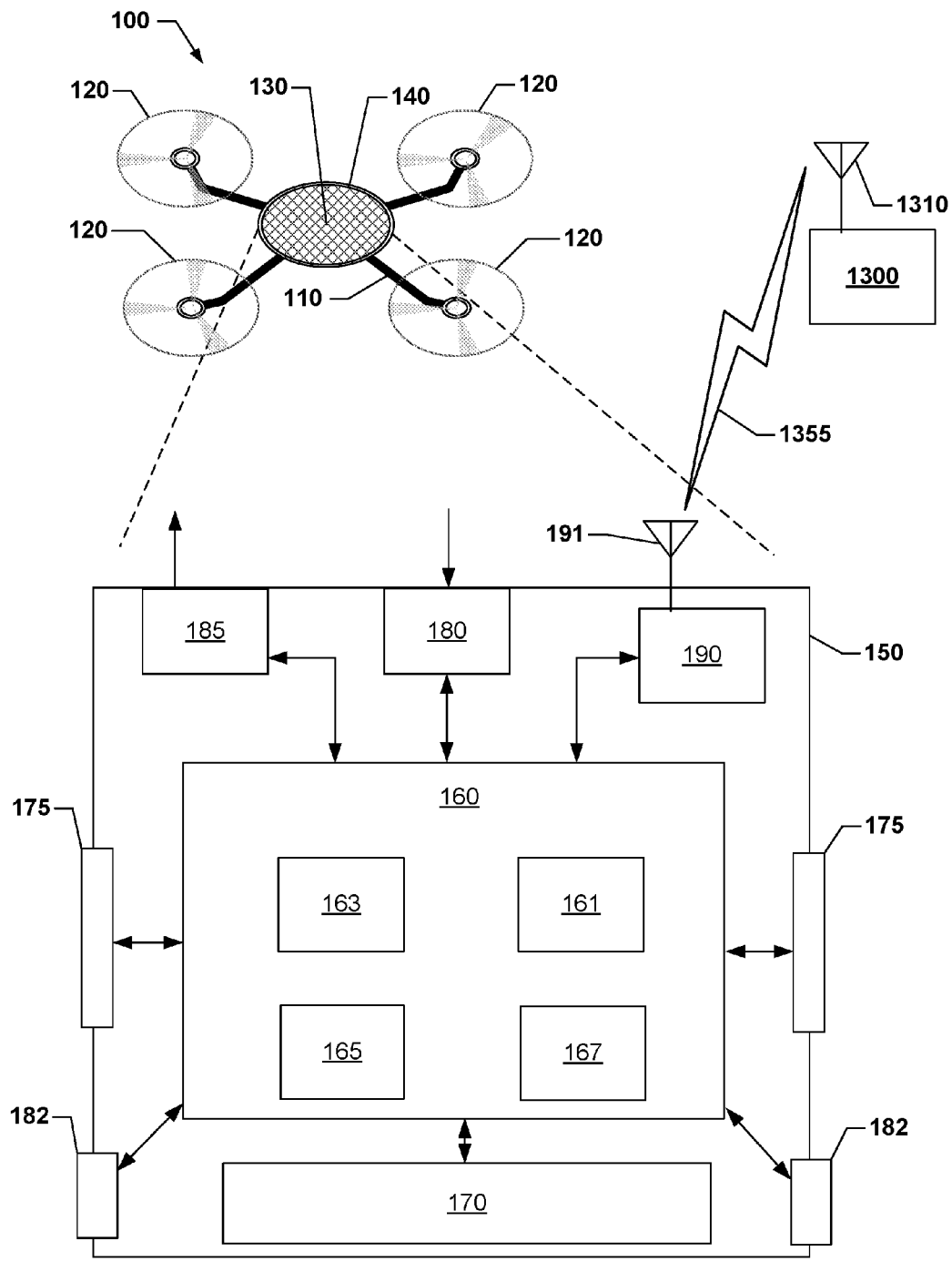
FIG. 5 is a component diagram of a control unit of a UAV suitable for use with various embodiments.

FIG. 5 illustrates a configuration of the UAV 100 that may be used with various embodiments. With reference to FIGS. 1A-5, the UAV 100 may include a control unit 150 that may house various circuits and devices used to power and control the operation of the UAV 100. The control unit 150 may include a processor 160, a power module 170, payload-securing units 175, an input module 180, sensors 182, an output module 185, and a radio module 190 coupled to an antenna 191. The processor 160 may include or be coupled to memory 161 and a navigation unit 163. The processor 160 may be configured with processor-executable instructions to control flight and other operations of the UAV 100, including operations of the various embodiments. The processor 160 may be coupled to one or more payload-securing units 175 and sensors 182. The payload-securing units 175 may include an actuator motor that drives a grip and release mechanism and related controls that are responsive to the control unit 150 to grip and release a payload in response to commands from the control unit 150.

The sensors 182 may be optical sensors, radio sensors, a camera, a rotary encoder, pressure sensors (i.e., for detecting wind, lift, drag, or changes therein) or other sensors. Alternatively or additionally, the sensors 182 may be contact or pressure sensors that may provide a signal that indicates when the UAV 100 has landed.

The power module 170 may include one or more batteries that may provide power to various components, including the processor 160, the payload-securing units 175, the input module 180, the sensors 182, the output module 185, and the radio module 190. In addition, the power module 170 may include energy storage components, such as rechargeable batteries. In this way, the processor 160 may be configured with processor-executable instructions to control the charging of the power module 170 (i.e., the storage of energy harvested from the airflow during an emergency recovery mode descent), such as by executing a charging control algorithm using a charge control circuit. Alternatively or additionally, the power module 170 may be configured to manage its own charging. The processor 160 may be coupled to an output module 185, which may output control signals for managing the motors that drive the rotors 120 and other components.

Through control of the individual motors of the rotors 120, the UAV 100 may be controlled in flight as the UAV 100 progresses toward a destination and/or operates in various modes (e.g., the emergency recovery mode or the braking mode). The processor 160 may receive data from the navigation unit 163 and use such data in order to determine the present position and orientation of the UAV 100, as well as the appropriate course towards the destination or landing sites. In various embodiments, the navigation unit 163 may include a global navigation satellite system (GNSS) receiver system (e.g., one or more Global Positioning System (GPS) receivers) enabling the UAV 100 to navigate using GNSS signals. Alternatively or in addition, the navigation unit 163 may be equipped with radio navigation receivers for receiving navigation beacons or other signals from radio nodes, such as navigation beacons (e.g., very high frequency (VHF) Omni Directional Radio Range (VOR) beacons), Wi-Fi access points, cellular network sites, radio station, remote computing devices, other UAVs, etc.

The processor 160 and/or the navigation unit 163 may be configured to communicate with a server through a wireless connection (e.g., a cellular data network) to receive commands to use or stop using the extended flight protocol, receive data useful in navigation, provide real-time position altitude reports, and assess data. An avionics module 167 coupled to the processor 160 and/or the navigation unit 163 may be configured to provide flight control-related information such as altitude, attitude, airspeed, heading and similar information that the navigation unit 163 may use for navigation purposes, such as dead reckoning between GNSS position updates. The avionics module 167 may include or receive data from a gyro/accelerometer unit 165 that provides data regarding the orientation and accelerations of the UAV 100 that may be used in navigation and positioning calculations.

The radio module 190 may be configured to receive signals via the antenna 191, such as command signals to initiate, continue, or discontinue the use of the extended flight protocol, receive signals from aviation navigation facilities, etc., and provide such signals to the processor 160 and/or the navigation unit 163 to assist in operation of the UAV 100. In some embodiments, commands for adjusting the tilt angle A of the pivotal platform 140 may be received via the radio module 190. In some embodiments, the UAV 100 may receive signals from wireless communication devices 1300 for changing the tilt angle (e.g., A) through wireless signals 1355 as the UAV 100 is in midflight or stationary. For example, the wireless signals 1355 may include input from a knowledge base regarding current conditions, a current orientation of the UAV 100 or elements thereof, predicted future conditions, requirements for particular UAV maneuvers or missions, aiming parameters of the aiming component (e.g., an optimal arc of directions) or even information regarding a target of the aiming component.

In various embodiments, the radio module 190 may be configured to switch between a cellular connection and a Wi-Fi or other form of radio connection depending on the location and altitude of the UAV 100. For example, while in flight at an altitude designated for UAV traffic, the radio module 190 may communicate with a cellular infrastructure in order to maintain communications with a server. An example of a flight altitude for the UAV 100 may be at around 400 feet or less, such as may be designated by a government authority (e.g., FAA) for UAV flight traffic. At this altitude, it may be difficult to establish communication with some of the wireless communication devices 1300 using short-range radio communication links (e.g., Wi-Fi). Therefore, communications with other wireless communication devices 1300 may be established using cellular telephone networks while the UAV 100 is at flight altitude. Communication between the radio module 190 and the wireless communication device 1300 may transition to a short-range communication link (e.g., Wi-Fi or Bluetooth) when the UAV 100 moves closer to the wireless communication device 1300. Similarly, the UAV 100 may include and employ other forms of radio communication, such as mesh connections with other UAVs or connections to other information sources (e.g., balloons or other stations for collecting and/or distributing weather or other data harvesting information).

In various embodiments, the control unit 150 may be equipped with the input module 180, which may be used for a variety of applications. For example, the input module 180 may receive images or data from an onboard camera or sensor, or may receive electronic signals from other components (e.g., a payload). The input module 180 may receive an activation signal for causing actuators on the 100 UAV to deploy landing cushions or similar components for affecting an emergency landing. In addition, the output module 185 may be used to activate components (e.g., an energy cell, an actuator, an indicator, a circuit element, a sensor, and/or an energy-harvesting element).

While the various components of the control unit 150 are illustrated in FIG. 5 as separate components, some or all of the components (e.g., the processor 160, the output module 185, the radio module 190, and other units) may be integrated together in a single device or module, such as a system-on-chip module.

FIGS. 6A-6C illustrate side elevation views of a UAV 600 with an aiming component 630 and a pivotal platform 640 on a lower side of the UAV 600 in accordance with some embodiments. With reference to FIGS. 1A-6C, the UAV 600 may be similar to the UAV 100 in many aspects. The UAV 600 may include a frame 610, a number of rotors 120, and the aiming component 630 mounted on the pivotal platform 640. The frame 610 may provide structural support for the pivotal platform 640 and the motors associated with the rotors 120. In addition, the pivotal platform 640 may support and/or hold the aiming component 630 so that the aiming component is fixed relative to the pivotal platform 640. The pivotal platform 640 may be smaller, larger, or of a size equal to the aiming component 630. Optionally, the pivotal platform 640 may form all or part of a housing of the aiming component 630.

The aiming component 630 may include an aiming surface 631 facing downward and away from the pivotal platform 640 in a first aiming direction $\alpha$ (as illustrated in FIG. 6A). The aiming component 630 may be similar to those described with regard to aiming component 130. Thus, the aiming component 630 may only operate acceptably when the first aiming direction $\alpha$ extends within a first arc of directions $\beta$ extending away from the UAV 600. In this way, when the first aiming direction $\alpha$, which is generally perpendicular to the aiming surface 631, does not extend within the first arc of directions $\beta$, the aiming component 630 may not operate or may operate below an optimal or acceptable level. The first arc of directions $\beta$ generally extends toward the target at which the aiming component 630 is intended to be aimed. For example, a planar antenna may be aimed at a remote ground-based transmitter, receiver, or transceiver target, a camera may be aimed toward a physical target, and wireless power links may be aimed toward a power source.

With the aiming component 630 fixed to the pivotal platform 640, any changes in a tilt angle A will cause a corresponding change to the first aiming direction $\alpha$ (as illustrated in FIG. 6B). This might result in link failure due to the tilt angle moving out of the range of $\beta$. Changing the tilt angle A may maintain the first aiming direction $\alpha$ within the first arc of directions $\beta$. During translational flight, if a leading edge of the pivotal platform 640 (i.e., a side facing into a wind) is tilted upward (as shown in FIG. 6B), air passing over the pivotal platform 640 will contribute lift that increases the lift/drag profile of the UAV 600. In contrast, a downwardly tilted leading edge may generate negative lift, which may decrease the lift/drag profile of the UAV 600. During translational flight, the UAV 600 may pitch down on one side to provide a horizontal thrust vector in a travel direction $T_D$ (as shown in FIG. 6C). The tilt angle A may then be adjusted to maintain a desired positive angle of attack to increase the lift/drag profile of the UAV 600. A platform angle b between the platform plane P and a horizontal plane H may differ from the tilt angle A when the UAV 600 pitches down on one side.

FIGS. 7A-7B illustrate side elevation views of a UAV 700 with a conical pivotal platform 740 and aiming component 730 inside the pivotal platform 740, both on a lower side of the UAV 700 in accordance with some embodiments. With reference to FIGS. 1A-7B, the UAV 700 may be similar to the UAVs 100, 600 in many aspects. The conical pivotal platform 740 and the aiming component 730 therein, for example, may provide a dual function of serving as landing gear and capturing a conical wireless recharging fixture. The conical pivotal platform 740 may include sufficient structural integrity to support the weight of the UAV 700 and even a range of payloads. The aiming component 730 may be directed toward a transmitter on the ground, such as a wireless recharging transmitter for recharging onboard batteries (e.g., power module 170) of the UAV 700 by harvesting energy from a wireless power transmission beam (e.g., a microwave beam). The aiming component 730 may also or alternatively physically capture a conical target containing a wireless charging system.

Although the aiming component 730 is located inside the conical pivotal platform 740, the aiming component 730 may include an aiming surface facing downward and away from the conical pivotal platform 740 in a first aiming direction α (as illustrated in FIG. 7A). The aiming component 730 may operate acceptably when the first aiming direction α extends within a first arc of directions extending away from the UAV 700, such as toward a power transmitter. The conical pivotal platform 740 may create drag during translational flight with the conical pivotal platform 740 aimed downward (as shown in FIG. 7A). Thus in accordance with some embodiments, the conical pivotal platform 740 may be tilted such that the first aiming direction α is aimed rearward (as illustrated in FIG. 7B). Tilting the conical pivotal platform 740 so that it is aimed rearward may reduce the overall drag of the platform during translational flight. Similar to other embodiments, the UAV 700 may include a tilt assembly with a locking mechanism configured to lock the conical pivotal platform 740 in the rearward orientation for translational flight. Before landing, the UAV 700 may reduce air speed, unlock the conical pivotal platform 740, allow the conical pivotal platform 740 to swing to the downward facing configuration, and once again lock the conical pivotal platform 740 in the downward facing configuration for landing. Alternatively, a mechanical feature of the conical pivotal platform 740 may be configured to automatically lock the tilt assembly when pressure from the ground or a landing surface is exerted on the UAV 700.

FIG. 8 illustrates a side elevation view of a UAV 800 with an upper-side pivotal platform 841 and a lower side pivotal platform 842, in according to various embodiments. With reference to FIGS. 1A-8, the UAV 800 may be similar to the UAVs 100, 600, 700 in many aspects. The UAV 800 may include an aiming component integrated into respective ones of the upper-side pivotal platform 841 and a lower side pivotal platform 842. Each of the upper-side pivotal platform 841 and the lower side pivotal platform 842 may include the same or different type of aiming component. For example, the upper-side pivotal platform 841 may include a solar array while the lower side pivotal platform 842 may include an antenna array. In addition, individual tilt angles of the upper-side pivotal platform 841 and the lower side pivotal platform 842 may be changed independently. Any changes for either of the upper-side pivotal platform 841 or the lower side pivotal platform 842 may be based upon considerations similar to those described for the UAVs 100 and 600, respectively.

FIGS. 9A-9F illustrate a UAV 900 with an annular aiming component 930 and a matching annular pivotal platform 940 in accordance with some embodiments. With reference to FIGS. 1A-9F, the UAV 900 may be similar to the UAV 100, 600, 700, 800 in many aspects. The UAV 900 may include a frame 910 and a number of rotors 120. Outer extremities of the frame 910 may include tilt assemblies 945 that provide structural support and pivotal movement for the pivotal platform 940. The tilt assemblies 945 in the UAV 900 may include wiring that allows for 360 degree or unlimited rotation. For example, slip rings may be used.

In addition, the pivotal platform 940 may support and/or hold one or more aiming component 930. Taking advantage of the annular design, one aiming component 930 may be disposed on one planar face of the pivotal platform 940 while another aiming component 930 may be disposed on the opposed planar face of the pivotal platform 940. In addition, two different aiming component types may be included if two oppositely facing aiming components 930 are used. For example, one aiming component 930 may include solar panels while another aiming component 930 may include an antenna array. Alternatively, the two oppositely facing aiming components 930 may both be antennas, but two different types. In such configurations, the pivotal platform 940 may be flipped over (~180 degrees) to use the appropriate one of the two oppositely facing aiming components 930. Any tilt angle changes for the pivotal platform 940 may be based upon considerations similar to those described with for the UAVs 100, 600, 700, 800.

The one or more aiming components 930 may be similar to those described with regard to the aiming component 130. Thus, the aiming component 930 may only operate acceptably when the first aiming direction α (illustrated in FIG. 9B) extends within a first arc of directions β extending away from the UAV 900. In this way, when the first aiming direction α, which is generally perpendicular to the surface of the aiming component 930, does not extend within the first arc of directions β, the aiming component 930 may not operate or may operate below an optimal or acceptable level.

Figure 9A:
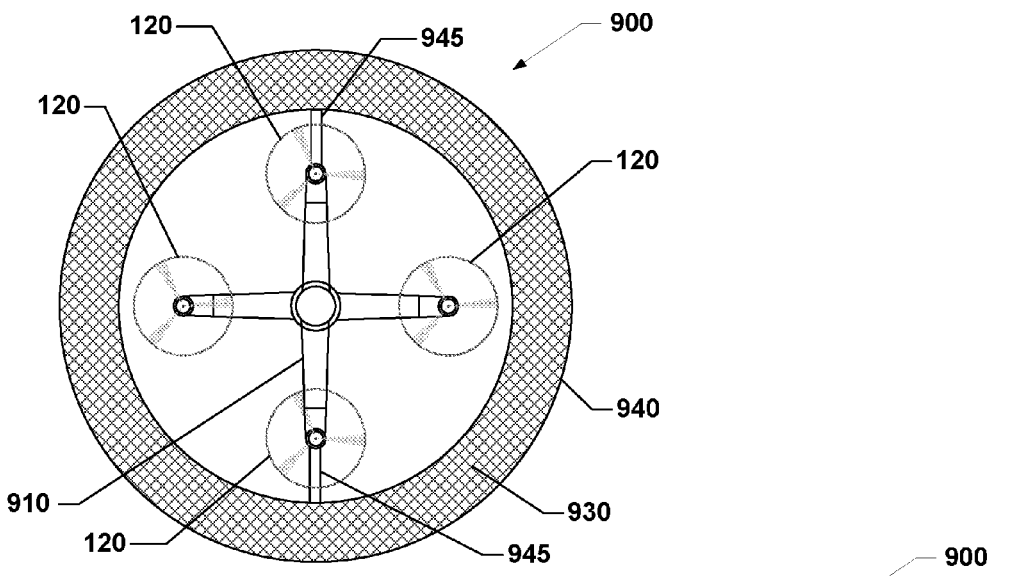
FIG. 9A is a plan view of a UAV with an annular aiming component and pivotal platform according to various embodiments.
Figure 9B:
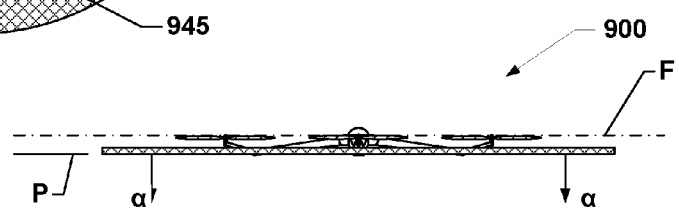
FIG. 9B is a side elevation view of the UAV in FIG. 9A according to various embodiments.
Figure 9C:
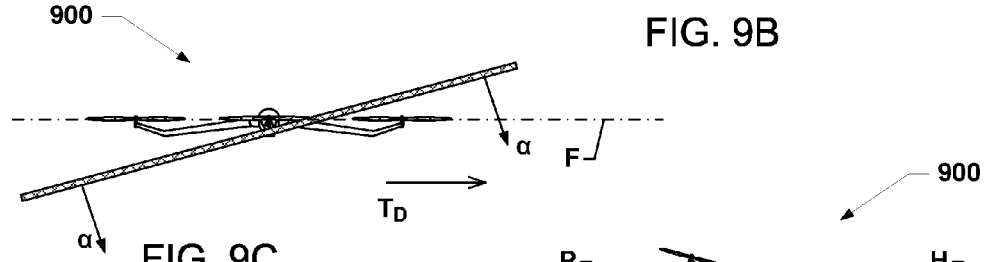
FIG. 9C is a side elevation view of the UAV in FIG. 9A with the pivotal platform tilted according to various embodiments.
Figure 9D:
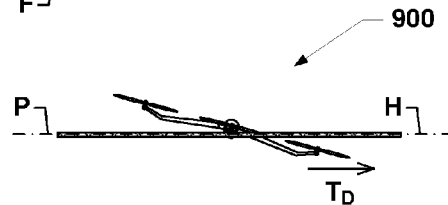
FIG. 9D is a side elevation view of the UAV in FIG. 9A pitching down on one side and with the pivotal platform tilted according to various embodiments.
Figure 9E:
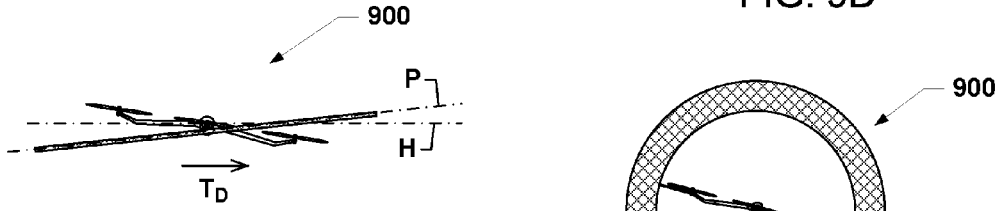
FIG. 9E is a side elevation view of the UAV in FIG. 9A pitching down on one side and with the pivotal platform tilted upward for positive lift according to various embodiments.

With the aiming component 930 fixed to the pivotal platform 940, any changes in a tilt angle will cause a corresponding change to the first aiming direction α (as illustrated in FIG. 9C). In this way, changing the tilt angle may maintain the first aiming direction α within the first arc of directions β. In addition, during translational flight, if a leading edge of the pivotal platform 940 (i.e., a side facing into a wind) is tilted upward (as shown in FIG. 9C), air caught underneath the pivotal platform 940 will contribute lift that increases the lift/drag profile of the UAV 900. In contrast, a downwardly tilted leading edge may generate negative lift, which may decrease the lift/drag profile of the UAV 900. In addition, during translational flight the UAV 900 may pitch down on one side to generate a horizontal thrust vector for traveling in a direction $T_D$ (as shown in FIGS. 9D and 9E). A platform angle, between the platform plane P and a horizontal plane H, may be different from the tilt angle, when the UAV 900 pitches down on one side. While FIG. 9D shows the platform plane P parallel to the horizontal plane P, FIG. 9E shows the platform plane P pitched upward from the horizontal plane P. Pitching the platform plane P upward on the side facing the direction of travel $T_D$ may provide positive lift.

Figure 9F:
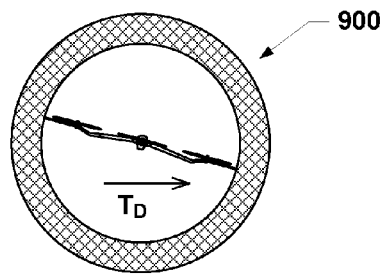
FIG. 9F is a side elevation view of the UAV in FIG. 9A pitching down on one side and with the pivotal platform tilted laterally in a low-draft configuration, according to various embodiments.

In addition, the UAV 900 may be configured to employ a low-drag configuration mode of operation as illustrated in FIG. 9F. In the low-drag configuration, the pivotal platform 940 may be oriented vertically, which will stabilize lateral movement of the UAV 900 when traveling in the generally horizontal travel direction $T_D$.

Figure 10:
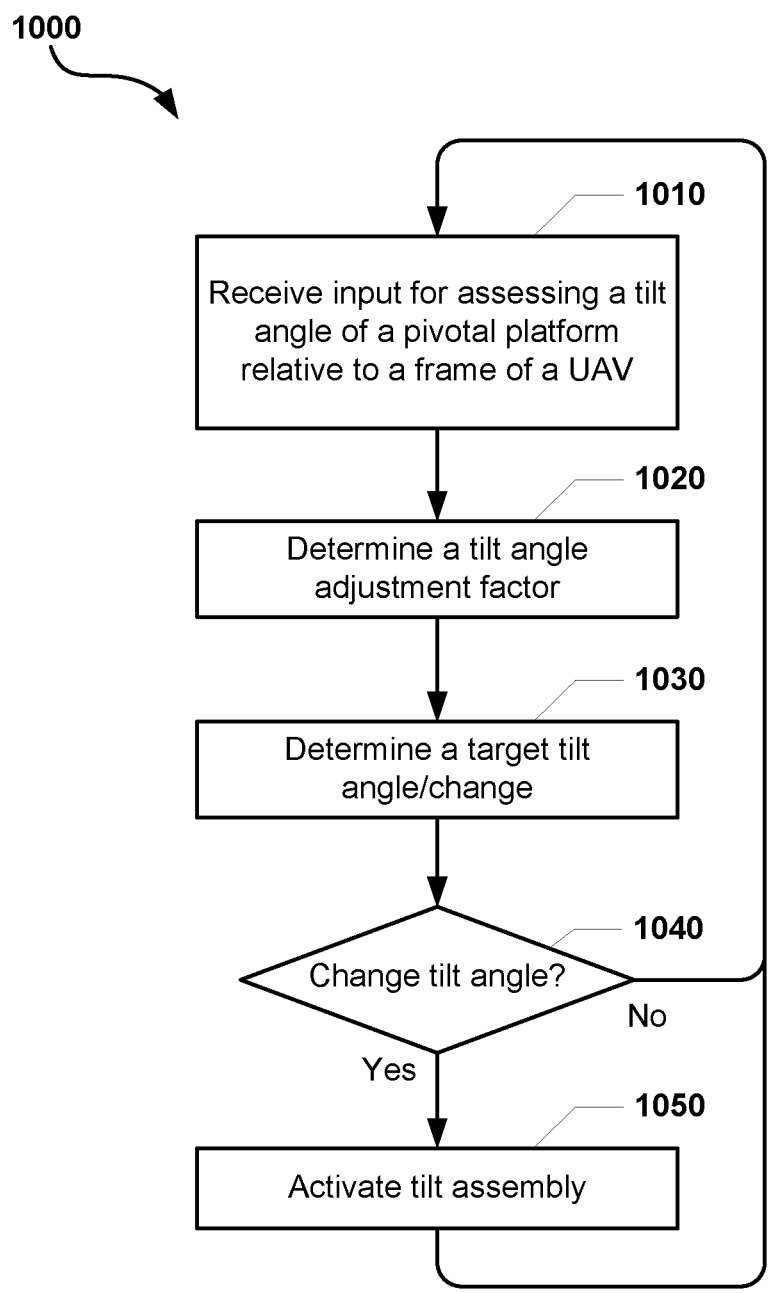
FIG. 10 is a process flow diagram illustrating a method of operating a UAV according to various embodiments.

FIG. 10 illustrates a method 1000 of operating a UAV (e.g., 100, 600, 700, 800, 900 in FIGS. 1A-9F) that may change a tilt angle (e.g., A, A', A'') of a pivotal platform (e.g., 140) relative to a UAV frame (e.g., 110) according to various embodiments. With reference to FIGS. 1-10, operations of the method 1000 may be performed by a UAV control unit 150 or another computing device (e.g., wireless communication device 1300 in FIG. 13 and/or server 1400 in FIG. 14) in communication with the UAV 100.

In block 1010, the processor of the UAV (e.g., the processor 160 in the control unit 150 or processor in a remote device, such as the wireless communication device 1300 or server 1400) may receive an input for assessing a tilt angle (e.g., A) of a pivotal platform (e.g., 140) relative to a frame (e.g., 110) of the UAV (e.g., 100). The input for assessing the tilt angle may come from a sensor, a remote source (e.g., via a receiver), a knowledge base (e.g., in an onboard and/or remote database), or systems controlling the operation of the UAV.

In block 1020, the processor of the UAV may determine at least one tilt angle adjustment factor for determining whether the tilt angle should be adjusted based on the input received in block 1010. The tilt angle adjustment factor may include a first aiming direction (e.g., α), a first arc of directions (e.g., β), a first adjustment of the lift/drag profile of the UAV, or any combination of one or more thereof. The first aiming direction may correspond to a direction in which the aiming surface (e.g., 131) of the aiming component (e.g., 130) is facing. The first arc of directions may correspond to a range of angles within which the aiming component operates acceptably. The determination regarding whether to change the tilt angle of the pivotal platform may be based on one or more inputs received by the processor, which may provide information regarding the tilt angle adjustment factor. For example, a sensor (e.g., 182) may detect a current tilt angle or changes in the tilt angle of the pivotal platform. In addition or alternatively, the sensor may detect wind speed/pressure, lift, drag, or changes therein. Further, the one or more inputs received by the processor may come from a knowledge base regarding current conditions, a current orientation of the UAV or elements thereof, predicted future conditions, requirements for particular UAV maneuvers or missions, aiming parameters of the aiming component (e.g., an optimal arc of directions) and/or information regarding a target of the aiming component.

In block 1030, the processor of the UAV may determine a target tilt angle or target change in tilt angle that is appropriate or needed for the aiming component to operate at the acceptable level. The tilt angle may be determined from the first aiming direction, the first arc of directions, and/or the first adjustment to the lift/drag profile determined in block 1020.

In determination block 1040, the processor may determine whether to change the current tilt angle (e.g., A) of the pivotal platform based on the tilt angle determined in block 1020 weighed against UAV mission parameters. In this way, if the tilt angle determined in block 1030 would result in the UAV not fulfilling one or more mission parameters, the processor may determine not to change the current tilt angle. Similarly, if the UAV is not configured to achieve the tilt angle determined in block 1030, the processor may determine that the current tilt angle should not be changed. Otherwise, the processor may determine that the current tilt angle should be changed.

In response to determining that the tilt angle should not be changed (i.e., determination block 1030="No"), the processor may wait to receive a new input in block 1010. Alternatively, a new tilt angle adjustment factor may be determined.

In response to determining that the tilt angle should be changed (i.e., determination block 1030="Yes"), the processor may activate the tilt assembly to implement the determined change in the tilt angle in block 1050. Activation of the tilt assembly may implement the desired tilt by activating a servomechanism (e.g., 250) for driving the pivotal platform with an actuator. Alternatively or additionally, activation of the tilt assembly may allow forces from at least one of a biasing element, environmental forces, and aerodynamic forces to change the tilt angle. For example, the tilt assembly may implement the desired tilt by unlocking (i.e., releasing) the pivotal platform to allow pivotal movement thereof, rapidly pitching the UAV while the pivotal platform remains in place due to its inertia, and then re-locking the pivotal platform and re-pitching the UAV back to its original attitude. While the determined change in tilt angle is being implemented or once the determined tilt angle change is achieved, the processor may deactivate the tilt assembly and wait to receive new input in block 1010.

Figure 11:
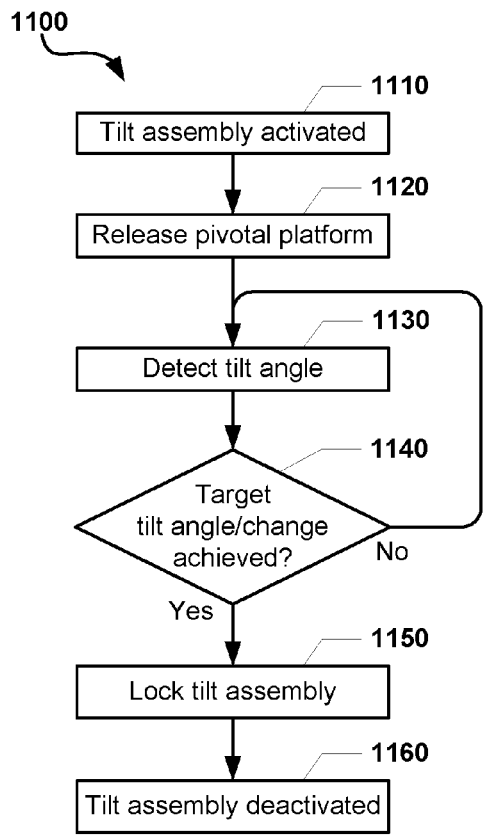
FIG. 11 is a process flow diagram illustrating a method of operating a UAV according to various embodiments.

FIG. 11 illustrates a method 1100 of changing a tilt angle using a tilt assembly of a UAV (e.g., 100, 600, 700, 800, 900 in FIGS. 1A-9F) that may change a tilt angle (e.g., A) of a pivotal platform (e.g., 140) relative to a UAV frame (e.g., 110) according to various embodiments. With reference to FIGS. 1-11, operations of the method 1100 may be performed by a UAV control unit 150 or another computing device (e.g., wireless communication device 1300 in FIG. 13 and/or server 1400 in FIG. 14) in communication with the UAV 100.

In block 1110, the processor of the UAV (e.g., the processor 160 in the control unit 150 or processor in a remote device, such as the wireless communication device 1300 or server 1400) may receive an input that activates the tilt assembly (e.g., 145).

In block 1120, the processor of the UAV may release the pivotal platform (e.g., 140). The release of the pivotal platform may unlock a mechanism preventing the pivotal platform from pivoting relative to the frame (e.g., 110).

In block 1130, in response to releasing the pivotal platform, a sensor (e.g., 182) may detect a current tilt angle of the pivotal platform or changes in the tilt angle of the pivotal platform. The sensor may be an onboard sensor of the UAV or a remote source (e.g., via a receiver) using one or more techniques that either measure a tilt angle and/or changes in tilt angle. The tilt angle or changes in the tilt angle detected by the sensor may be received by the processor.

In determination block 1140, based on input from the sensor regarding the tilt angle, the processor may determine whether a target tilt angle or target tilt angle change has been achieved. In response to determining that the target tilt angle/change has not been achieved (i.e., determination block 1140="No"), the sensor may continue to detect a current tilt angle in block 1130.

In response to determining that the target tilt angle/change has been achieved (i.e., determination block 1140="Yes"), the processor may lock the tilt assembly in place in block 1150. Alternatively, a range of target tilt angles or range of tilt angle changes may be used so that if the tilt angle or the tilt angle change fall within the range, the tilt angle/change is considered to have achieved the target tilt angle/change.

In block 1160, the processor may deactivate any additional active components of the tilt assembly. For example, one or more sensors configured to detect tilt angle changes or a current tilt angle may be deactivated.

Figure 12:
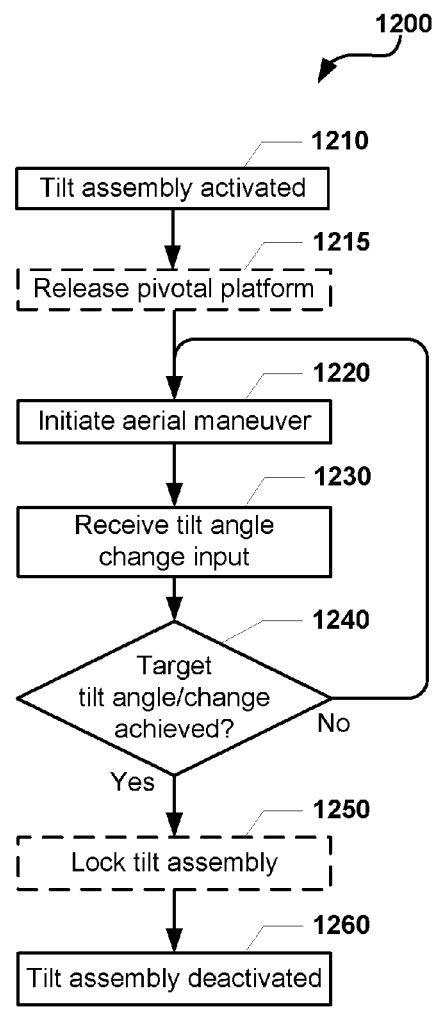
FIG. 12 is a process flow diagram illustrating a method of operating a UAV according to various embodiments.

FIG. 12 illustrates a method 1200 of changing a tilt angle using a tilt assembly of a UAV (e.g., 100, 600, 700, 800, 900 in FIGS. 1A-9F) that may change a tilt angle (e.g., A) of a pivotal platform (e.g., 140) relative to a UAV frame (e.g., 110) according to various embodiments. With reference to FIGS. 1-12, operations of the method 1200 may be performed by a UAV control unit 150 or another computing device (e.g., wireless communication device 1300 in FIG. 13 and/or server 1400 in FIG. 14) in communication with the UAV 100.

In block 1210, the processor of the UAV (e.g., the processor 160 in the control unit 150 or processor in a remote device, such as the wireless communication device 1300 or server 1400) may receive an input that activates the tilt assembly (e.g., 145).

In optional block 1215, the processor of the UAV may release the pivotal platform (e.g., 140). The release of the pivotal platform may unlock a mechanism preventing the pivotal platform from pivoting relative to the frame (e.g., 110). Optional block 1215 need not be implemented in some embodiments that do not lock the pivotal movement of the pivotal platform, such as when a biasing element or other mechanism induces, limits, or restricts pivotal movement.

In block 1220, the processor of the UAV may activate elements of the UAV (e.g., 100) for initiating an aerial maneuver. The aerial maneuver may include one or more changes in attitude, velocity, and/or position calculated to achieve a target tilt angle/change.

In block 1230, in response to initiating the aerial maneuver, a sensor (e.g., 182) may detect a current tilt angle of the pivotal platform or changes in the tilt angle of the pivotal platform. The sensor may be an onboard sensor of the UAV or a remote source (e.g., via a receiver) using one or more techniques that measure either a tilt angle and/or a change in tilt angle. The tilt angle or changes in the tilt angle detected by the sensor may be received by the processor.

In determination block 1240, based on input from the sensor regarding the tilt angle, the processor may determine whether a target tilt angle or target tilt angle change has been achieved. In response to determining that the target tilt angle/change has not been achieved (i.e., determination block 1240="No"), the processor may ensure that the UAV continues aerial maneuvers or performs new aerial maneuvers in block 1220.

In response to determining that the target tilt angle/change has been achieved (i.e., determination block 1240="Yes"), the processor may optionally lock the tilt assembly in optional block 1250. Otherwise, if the tilt assembly does not lock, cannot be locked, or does not need to be locked, the tilt assembly may be deactivated in block 1260. A range of target tilt angles or range of tilt angle changes may be used so that if the tilt angle or the tilt angle change fall within the range, the tilt angle/change is considered to have achieved the target tilt angle/change.

Figure 13:
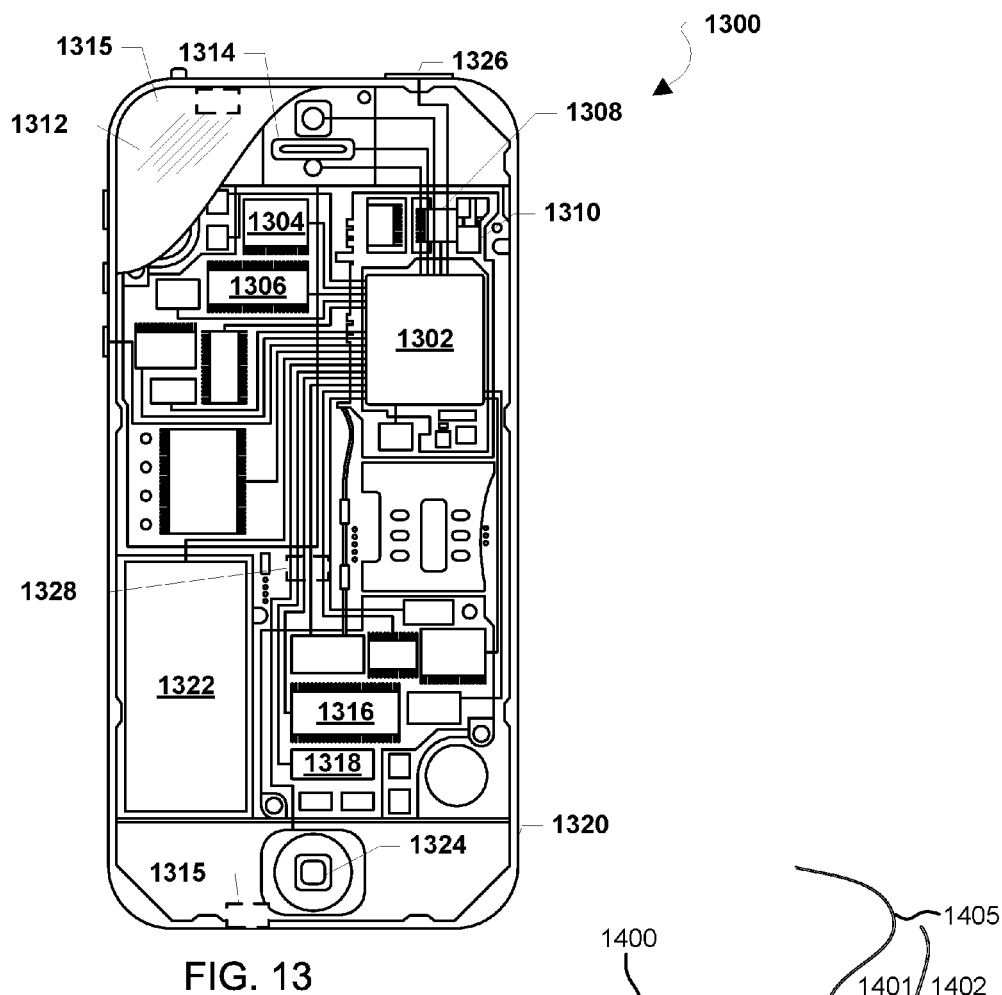
FIG. 13 is a component diagram of a wireless communication device suitable for use with various embodiments.
Figure 14:
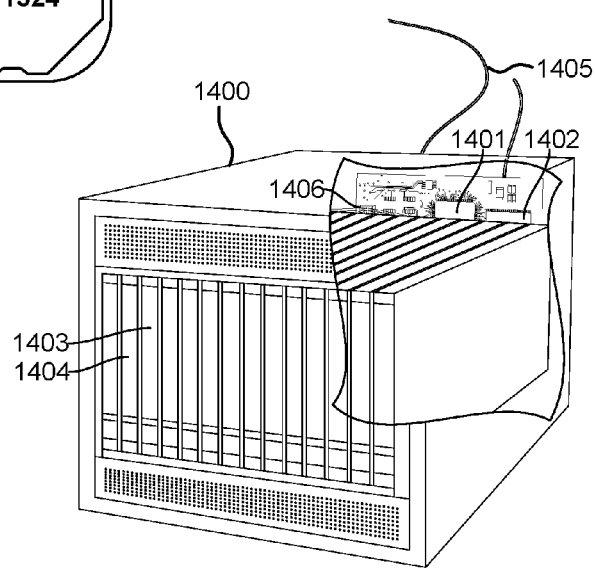
FIG. 14 is a component diagram of an example server suitable for use with the various embodiments.

As described, the processor determining whether a tilt angle of a pivotal platform needs to be changed may be in a separate computing device that is in communication with the UAV. In such embodiments, communications with the UAV (e.g., 100, 600, 700, 800, 900 in FIGS. 1A-9F) may be implemented using any of a variety of wireless communication devices (e.g., smartphones, tablets, smartwatches, etc.) an example of which is illustrated in FIG. 13. The wireless communication device 1300 may include a processor 1302 coupled with the various systems of the wireless communication device 1300 for communication with and control thereof. For example, the processor 1302 may be coupled to a touch screen controller 1304, radio communication elements, speakers and microphones, and an internal memory 1306. The processor 1302 may be one or more multi-core integrated circuits designated for general or specific processing tasks. The internal memory 1306 may be volatile or non-volatile memory, and may also be secure and/or encrypted memory, or unsecure and/or unencrypted memory, or any combination thereof. In another embodiment (not shown), the wireless communication device 1300 may also be coupled to an external memory, such as an external hard drive.

The touch screen controller 1304 and the processor 1302 may also be coupled to a touch screen panel 1312, such as a resistive-sensing touch screen, capacitive-sensing touch screen, infrared sensing touch screen, etc. Additionally, the display of the wireless communication device 1300 need not have touch screen capability. The wireless communication device 1300 may have one or more radio signal transceivers 1308 (e.g., Peanut, Bluetooth, Bluetooth LE, ZigBee, Wi-Fi®, radio frequency (RF) radio, etc.) and antennae, the wireless communication device antenna 1310, for sending and receiving communications, coupled to each other and/or to the processor 1302. The radio signal transceivers 1308 and the wireless communication device antenna 1310 may be used with the above-mentioned circuitry to implement the various wireless transmission protocol stacks and interfaces. The wireless communication device 1300 may include a cellular network wireless modem chip 1316 coupled to the processor that enables communication via a cellular network.

The wireless communication device 1300 may include a peripheral device connection interface 1318 coupled to the processor 1302. The peripheral device connection interface 1318 may be singularly configured to accept one type of connection, or may be configured to accept various types of physical and communication connections, common or proprietary, such as USB, FireWire, Thunderbolt, or PCIe. The peripheral device connection interface 1318 may also be coupled to a similarly configured peripheral device connection port (not shown).

In various embodiments, the wireless communication device 1300 may include one or more microphones 1315. For example, the wireless communication device may have microphones 1315 that are conventional for receiving voice or other audio frequency energy from a user during a call.

The wireless communication device 1300 may also include speakers 1314 for providing audio outputs. The wireless communication device 1300 may also include a housing 1320, constructed of a plastic, metal, or a combination of materials, for containing all or some of the components discussed herein. The wireless communication device 1300 may include a power source 1322 coupled to the processor 1302, such as a disposable or rechargeable battery. The rechargeable battery may also be coupled to the peripheral device connection port to receive a charging current from a source external to the wireless communication device 1300. The wireless communication device 1300 may also include a physical button 1324 for receiving user inputs. The wireless communication device 1300 may also include a power button 1326 for turning the wireless communication device 1300 on and off.

In various embodiments, the wireless communication device 1300 may further include an accelerometer 1328, which senses movement, vibration, and other aspects of the device through the ability to detect multi-directional values of and changes in acceleration. In the various embodiments, the accelerometer 1328 may be used to determine the x, y, and z positions of the wireless communication device 1300. Using the information from the accelerometer, a pointing direction of the wireless communication device 1300 may be detected.

Various forms of computing devices may be used to communicate with a processor of a UAV, including personal computers, wireless communication devices (e.g., smartphones, etc.), servers, laptop computers, etc., to implement the various embodiments including the embodiments described with reference to FIGS. 1A-14. Such computing devices may typically include, at least, the components illustrated in FIG. 14, which illustrates an example server computing device. With reference to FIGS. 1A-14, the server 1400 may typically include a processor 1401 coupled to volatile memory 1402 and a large capacity nonvolatile memory, such as a disk drive 1403. The server 1400 may also include a floppy disc drive, compact disc (CD) or DVD disc drive 1406 coupled to the processor 1401. The server 1400 may also include network access ports 1404 (or interfaces) coupled to the processor 1401 for establishing data connections with a network 1405, such as the Internet and/or a local area network coupled to other system computers and servers. Similarly, the server 1400 may include additional access ports, such as USB, Firewire, Thunderbolt, and the like for coupling to peripherals, external memory, or other devices.

In various embodiments, the UAV (e.g., 100) may be configured to periodically check the functioning of the navigation unit (e.g., 163) and/or communication links with the server 1400. Such functionality may be checked through a periodic heart beat check. For example, the UAV may receive periodic communications from the server 1400 indicating that a wireless connection is still maintained and viable. Alternatively or in addition, the UAV may send periodic communications to the server 1400 providing current location coordinates of the UAV and/or indicating that the navigation unit and other UAV systems are still functioning. If the processor (e.g., 160) of the UAV determines that the navigation unit and other UAV systems are not functioning, corrective action may be taken. For example, in the event the UAV loses contact with an information source or other communication link, such as due to jamming, pirate signals, masking by buildings, or tampering of the UAV, and the UAV has no other way to determine location, the UAV may issue an alert to the server 1400 and land. During such a landing, the UAV may exploit the emergency recovery mode harvesting, if conditions warrant. In this way, the UAV may autonomously determine a descent profile, including identification of impromptu potential landing sites, or use information it already has to locate designated landing site.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. An unmanned aerial vehicle (UAV), comprising:
a pivotal platform configured to selectively tilt relative to a frame of the UAV;
a tilt assembly configured to change a tilt angle of the pivotal platform relative to the frame; and
a processor coupled to the tilt assembly and configured with processor-executable instructions to:
determine whether to implement a first change of the tilt angle of the pivotal platform in order to cause a first adjustment of a lift/drag profile of the UAV; and
activate the tilt assembly to implement the determined first change in the tilt angle of the pivotal platform in response to determining that the first change should be implemented.

2. The UAV of claim 1, further comprising:
an aiming component fixed to the pivotal platform, the aiming component having an aiming surface facing away from the pivotal platform in a first aiming direction, wherein the aiming component operates at an acceptable level when the first aiming direction extends within a first arc of directions extending away from the UAV, wherein the first change in the tilt angle causes a corresponding change to the first aiming direction,
wherein the processor is further configured with processor-executable instructions to determine whether to implement the first change of the tilt angle of the pivotal platform based on the first aiming direction, the first arc of directions, and the first adjustment to the lift/drag profile.

3. The UAV of claim 2, wherein the pivotal platform is centrally mounted on an upper side of the frame.

4. The UAV of claim 2, wherein the first aiming direction extends above the UAV.

5. The UAV of claim 2, wherein the pivotal platform is centrally mounted on a lower side of the frame.

6. The UAV of claim 2, wherein the first aiming direction extends below the UAV.

7. The UAV of claim 2, wherein the pivotal platform is an annular structure surrounding the frame.

8. The UAV of claim 2, wherein the aiming component includes a planar antenna.

9. The UAV of claim 2, wherein the aiming component includes a solar panel.

10. The UAV of claim 2, wherein the aiming component includes a camera.

11. The UAV of claim 2, wherein the aiming component includes a wireless power link.

12. The UAV of claim 2, wherein the pivotal platform includes a hollow conical structure with a wider open end thereof spaced away from the tilt assembly, wherein the aiming component is a wireless recharging target configured to receive power for recharging the UAV.

13. The UAV of claim 12, wherein the hollow conical structure serves as a primary landing gear assembly for the UAV.

14. The UAV of claim 1, wherein the tilt assembly includes a servomechanism configured to drive the pivotal platform to the determined first change of the tilt angle.

15. The UAV of claim 1, wherein the tilt assembly is configured to selectively allow the tilt angle to change in response to external forces imparted on the UAV.

16. The UAV of claim 1, wherein the tilt assembly includes a biasing element configured to induce the determined first change in the tilt angle.

17. The UAV of claim 1, further comprising:
a sensor coupled to the processor;
wherein the processor the processor is further configured with processor-executable instructions to:
receive an input from the sensor; and
use the input received from the sensor to determine at least one tilt angle adjustment factor for determining whether the tilt angle should be adjusted.

18. The UAV of claim 1, further comprising:
a receiver coupled to the processor;
wherein the processor is further configured with processor-executable instructions to:
receive an input from the receiver; and
use the input received from the receiver to determine at least one tilt angle adjustment factor for determining whether the tilt angle should be adjusted.

19. A method of operating an unmanned aerial vehicle (UAV), the method comprising:
receiving, in a processor, a first input for assessing a tilt angle of a pivotal platform relative to a frame of the UAV, wherein the pivotal platform is configured to selectively tilt relative to the frame, and a first change in the tilt angle causes a first adjustment of a lift/drag profile of the UAV, wherein the pivotal platform supports an aiming component that includes an aiming surface facing away from the pivotal platform in a first aiming direction, wherein the aiming component operates at an acceptable level when the first aiming direction extends within a first arc of directions extending away from the UAV, wherein the changes in the tilt angle cause a corresponding change to the first aiming direction;
determining, in the processor based on the first input, at least one tilt angle adjustment factor selected from a group consisting of the first aiming direction, the first arc of directions, and the first adjustment of the lift/drag profile;
determining, in the processor, the first change of the tilt angle based on the first aiming direction, the first arc of directions, and the first adjustment to the lift/drag profile; and
activating a tilt assembly to change the tilt angle according to the first change.

20. The method of claim 19, wherein activating the tilt assembly to change the tilt angle comprises:
activating a servomechanism driving the tilt assembly.

21. The method of claim 19, wherein activating the tilt assembly to change the tilt angle comprises:
allowing at least one of a biasing element, environmental forces, and aerodynamic forces to change the tilt angle.

22. The method of claim 19, wherein activating the tilt assembly to change the tilt angle comprises:
releasing the pivotal platform from a first fixed position;
detecting the tilt angle has achieved the first change when the pivotal platform reaches a second position; and
locking the pivotal platform in the second position.

23. The method of claim 19, further comprising:
activate elements of the UAV for initiating an aerial maneuver based the first change of the tilt angle;
receiving a second input, in the processor, regarding a second change of the tilt angle;

determining whether the second change of the tilt angle matches the first change of the tilt angle; and locking the tilt angle in a second position in response to determining the second change of the tilt angle matches the first change of the tilt angle.

24. An unmanned aerial vehicle (UAV), comprising:

a frame;

a pivotal platform pivotally coupled to the frame configured to selectively tilt relative to the frame, wherein a first change in a tilt angle of the pivotal platform relative to the frame causes a first adjustment of a lift/drag profile of the UAV based on the tilt angle;

an aiming component supported by the pivotal platform that includes an aiming surface facing away from the pivotal platform in a first aiming direction, wherein the aiming component operates at an acceptable level when the first aiming direction extends within a first arc of directions extending away from the UAV, wherein the changes in the tilt angle cause a corresponding change to the first aiming direction;

means for receiving a first input for assessing the tilt angle of the pivotal platform relative to the frame;

means for determining, based on the first input, at least one tilt angle adjustment factor selected from a group consisting of the first aiming direction, the first arc of directions, and the first adjustment of the lift/drag profile;

means for determining the first change of the tilt angle based on the first aiming direction, the first arc of directions, and the first adjustment to the lift/drag profile; and means for activating a tilt assembly to change the tilt angle according to the first change.

25. A non-transitory processor-readable storage medium having stored thereon processor-executable instructions configured to cause a processor of an unmanned aerial vehicle (UAV) to perform operations comprising:

receiving a first input for assessing a tilt angle of a pivotal platform relative to a frame of the UAV, wherein the pivotal platform is configured to selectively tilt relative to the frame and a first change in the tilt angle causes a first adjustment of a lift/drag profile of the UAV, wherein the pivotal platform supports an aiming component that includes an aiming surface facing away from the pivotal platform in a first aiming direction, wherein the aiming component operates at an acceptable level when the first aiming direction extends within a first arc of directions extending away from the UAV, wherein the changes in the tilt angle cause a corresponding change to the first aiming direction;

determining, based on the first input, at least one tilt angle adjustment factor selected from a group consisting of the first aiming direction, the first arc of directions, and the first adjustment of the lift/drag profile;

determining the first change of the tilt angle based on the first aiming direction, the first arc of directions, and the first adjustment to the lift/drag profile; and activating a tilt assembly to change the tilt angle according to the first change.

26. The non-transitory processor-readable storage medium of claim 25, wherein the stored processor-executable instructions are configured to cause the processor to perform operations further comprising:

allowing at least one of a biasing element, environmental forces, and aerodynamic forces to change the tilt angle.

27. The non-transitory processor-readable storage medium of claim 25, wherein the stored processor-executable instructions are configured to cause the processor to perform operations further comprising:

releasing the pivotal platform from a first fixed position;

detecting the tilt angle has achieved the first change when the pivotal platform reaches a second position; and locking the pivotal platform in the second position.

28. The non-transitory processor-readable storage medium of claim 25, wherein the stored processor-executable instructions are configured to cause the processor to perform operations further comprising:

activating elements of the UAV for initiating an aerial maneuver based the first change of the tilt angle;

receiving a second input, in the processor, regarding a second change of the tilt angle;

determining whether the second change of the tilt angle matches the first change of the tilt angle; and locking the tilt angle in a second position in response to determining the second change of the tilt angle matches the first change of the tilt angle.

* * * * *